(12) United States Patent
Yang et al.

(10) Patent No.: US 12,130,528 B2
(45) Date of Patent: Oct. 29, 2024

(54) DISPLAY PANEL AND DISPLAY DEVICE

(71) Applicant: HKC CORPORATION LIMITED, Shenzhen (CN)

(72) Inventors: Yuanjie Yang, Shenzhen (CN); Rongrong Li, Shenzhen (CN)

(73) Assignee: HKC CORPORATION LIMITED, Shenzhen (CN)

( * ) Notice: Subject to any disclaimer, the term of this patent is extended or adjusted under 35 U.S.C. 154(b) by 0 days.

(21) Appl. No.: 18/348,326

(22) Filed: Jul. 6, 2023

(65) Prior Publication Data

US 2024/0210776 A1 Jun. 27, 2024

(30) Foreign Application Priority Data

Dec. 27, 2022 (CN) .......................... 202211682053.7

(51) Int. Cl.
*G02F 1/1362* (2006.01)

(52) U.S. Cl.
CPC ................................ *G02F 1/13629* (2021.01)

(58) Field of Classification Search
CPC ........... G02F 1/13629; G02F 1/136286; G02F 1/134318
See application file for complete search history.

(56) References Cited

U.S. PATENT DOCUMENTS

| | | | |
|---|---|---|---|
| 6,392,735 B1 * | 5/2002 | Tani | G02F 1/1339 349/155 |
| 2006/0139556 A1 | 6/2006 | Ahn | |
| 2014/0104149 A1 * | 4/2014 | Lee | G02F 1/133345 345/92 |
| 2015/0055041 A1 | 2/2015 | Jiang et al. | |
| 2019/0288008 A1 * | 9/2019 | Park | G09G 3/3677 |
| 2020/0081289 A1 * | 3/2020 | Shin | G02F 1/136286 |
| 2022/0114980 A1 | 4/2022 | Gao et al. | |

FOREIGN PATENT DOCUMENTS

| | | |
|---|---|---|
| CN | 1794048 A | 6/2006 |
| CN | 103389588 A | 11/2013 |
| CN | 106647054 A | 5/2017 |
| CN | 109581755 A | 4/2019 |
| CN | 111090202 A | 5/2020 |

* cited by examiner

*Primary Examiner* — Dung T Nguyen
*Assistant Examiner* — David Y Chung
(74) *Attorney, Agent, or Firm* — Franklin & Associates International Inc; Matthew F. Lambrinos (57) ABSTRACT

The present application relates to a display panel and a display device. The display panel comprises a first substrate and a second substrate which are oppositely arranged, wherein the first substrate comprises a wiring area and a border glue in a border area, the wiring area comprises a common electrode wire, a gate driving circuit and a clock signal line which are sequentially arranged, conductive particles are arranged in the border glue, the second substrate comprises a common electrode layer, the border glue at least partially overlaps the wiring area, and the common electrode layer is at least partially hollowed out in the border area corresponding to the clock signal line.

17 Claims, 5 Drawing Sheets

DISPLAY PANEL AND DISPLAY DEVICE

CROSS-REFERENCE TO RELATED APPLICATIONS

The present application claims the priority of Chinese Patent Application No. 202211682053.7 entitled "Display Panel and Display Device" filed on Dec. 27, 2022, the entire contents of which are incorporated herein by reference.

FIELD

The present application relates to the technical field of display, in particular to a display panel and a display device.

BACKGROUND

A liquid crystal display (LCD) includes a first substrate, a second substrate opposite the first substrate and a liquid crystal layer located between the first substrate and the second substrate. Alignment films are respectively formed on the inner sides of the first substrate and the second substrate for guiding the arrangement direction of liquid crystal molecules. In addition, mechanical connection and electrical connection are realized between the first substrate and the second substrate through border glue located in a border area. Generally, signals of the LCD are input from a first substrate side and transmitted to a common electrode (CF-Com) of a second substrate side through Au balls in the border glue, so as to realize signal communication between the first substrate and the second substrate. However, the border glue cannot overlap a clock signal (CK Busline) wiring area in the border area, otherwise the Au balls will cause short-circuiting between each clock signal line and the CF-Com on the second substrate side, which will seriously affect the narrow border design of a product.

SUMMARY

The present application aims to provide a display panel and a display device. The display panel features a narrow border design, shorter border glue application time, higher production capacity, and lower manufacturing cost.

In a first aspect, an embodiment of the present application proposes a display panel, which is provided with a display area and a border area located at the periphery of the display area. The display panel comprises a first substrate and a second substrate which are oppositely arranged. The first substrate comprises a wiring area and a border glue in the border area. The wiring area comprises a common electrode wire, a gate driving circuit and a clock signal line which are sequentially arranged in a direction away from the display area. Conductive particles are arranged in the border glue, and the second substrate comprises a common electrode layer. The common electrode layer is in signal communication with the common electrode wire through the conductive particles. Here, the border glue at least partially overlaps the wiring area, and the common electrode layer is at least partially hollowed out in the border area corresponding to the clock signal line, so that the common electrode layer is insulated from the clock signal line.

In a second aspect, an embodiment of the present application provides a display device, which comprises the aforementioned display panel; and a backlight module arranged at a backlight side of the display panel and used for providing a light source for the display panel.

According to the display panel and display device provided by the embodiments of the present application, a display area and a border area located at the periphery of the display area are provided. The display panel comprises a first substrate and a second substrate which are oppositely arranged. The first substrate comprises a wiring area and a border glue in the border area. The wiring area comprises a common electrode wire, a gate driving circuit and a clock signal line which are sequentially arranged in a direction away from the display area. Conductive particles are arranged in the border glue, and the second substrate comprises a common electrode layer. The common electrode layer is in signal communication with the common electrode wire through the conductive particles. Here, the border glue at least partially overlaps the wiring area, and the common electrode layer is at least partially hollowed out in the border area corresponding to the clock signal line, so that the common electrode layer is insulated from the clock signal line. In this way, by allowing the border glue in the border area of the first substrate to at least partially overlap the wiring area, the width of the border area can be reduced, so that the narrow border design can be realized; moreover, the common electrode layer of the second substrate is at least partially hollowed out in the border area corresponding to the wiring area, which can prevent short-circuiting between the clock signal line and the common electrode layer through the conductive particles; and the wiring area only needs one coating process, thus reducing the process difficulty of border glue application, shortening the time of border glue application, improving the production capacity and reducing the manufacturing cost.

BRIEF DESCRIPTION OF THE DRAWINGS

Features, advantages and technical effects of exemplary embodiments of the present application will be described below with reference to the accompanying drawings. The same reference numerals are used for the same parts in the drawings. The attached drawings are not drawn according to the actual scale, and are only used to show the relative position relationship. The layer thickness of some parts is exaggerated to facilitate understanding, and the layer thickness in the attached drawings does not represent the proportional relationship of the actual layer thickness.

DESCRIPTION OF REFERENCE NUMERALS 1. first substrate; AA. display area; NA. border area; LA. wiring area; 1a. common electrode wire; 1b. gate driving circuit; 1c. clock signal line; 1d. conductive electrode;

10. first substrate base; 11. first metal layer; 12. insulating layer; 13. second metal layer; 131. metal wire; H. adapter hole; 14. passivation layer; 15. planarization layer; 16. conductive layer; 17. border glue; 171. conductive particle;
2. second substrate; 20. second substrate base; 22. shading layer; 23. common electrode layer; 231. first common electrode part; 232. second common electrode part; 233. hollowed-out part;
3. liquid crystal layer.

DETAILED DESCRIPTION

Features and exemplary embodiments of various aspects of the present application will be described in detail below. In the following detailed description, numerous specific details are set forth in order to provide a thorough understanding of the present application. However, it will be apparent to those skilled in the art that the present application may be practiced without some of these specific details. The following description of the embodiments is only to provide a better understanding of the present application by showing examples of the present application. In the drawings and the following description, at least some well-known structures and techniques are not shown in order to avoid unnecessarily obscuring the present application; also, the size of the regional structure may be exaggerated for clarity. Further, the features, structures or characteristics described below may be combined in one or more embodiments in any suitable manner.

First Embodiment

Figure 1:
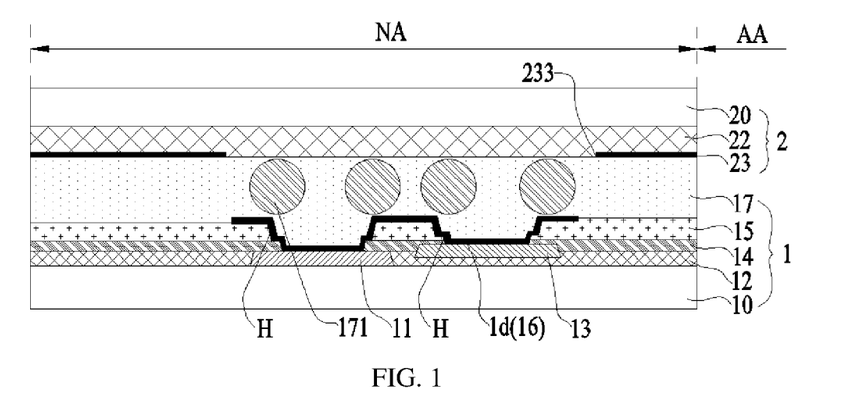
FIG. 1 shows a structural diagram of a display panel provided by a first embodiment of the present application.
Figure 2:
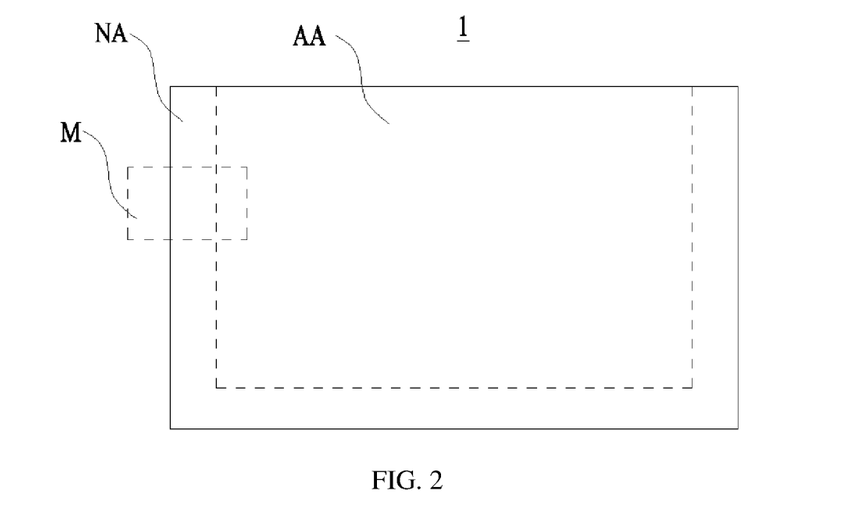
FIG. 2 shows a structural diagram of a first substrate of the display panel shown in FIG. 1.

FIG. 1 shows a structural diagram of a display panel provided by a first embodiment of the present application; FIG. 2 shows a structural diagram of a first substrate of the display panel shown in FIG. 1; and FIG. 3 shows an enlarged view of area M in FIG. 2.

Figure 3:
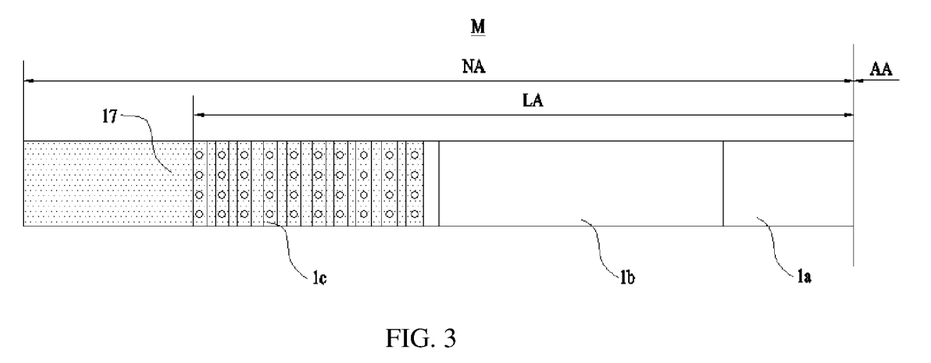
FIG. 3 shows an enlarged view of area M in FIG. 2.

As shown in FIGS. 1-3, the display panel provided by the first embodiment of the present application is provided with a display area AA and a border area NA located at the periphery of the display area AA. The display panel comprises a first substrate 1 and a second substrate 2 which are oppositely arranged. The first substrate 1 comprises a wiring area LA and a border glue 17 in the border area NA, and the wiring area LA comprises a common electrode wire 1a, a gate driving circuit 1b and a clock signal line 1c which are sequentially arranged in a direction away from the display area AA. Conductive particles 171 are arranged in the border glue 17, the second substrate 2 comprises a common electrode layer 23, and the common electrode layer 23 is in signal communication with the common electrode wire 1a through the conductive particles 171. The border glue 17 at least partially overlaps the wiring area LA, and the common electrode layer 23 is at least partially hollowed out in the border area NA corresponding to the clock signal line 1c, so that the common electrode layer 23 is insulated from the clock signal line 1c.

In this embodiment, the display panel is a liquid crystal display panel, the first substrate 1 can be an array substrate, and the second substrate 2 can be a color film substrate. A liquid crystal layer (not shown in the figure) is further arranged between the first substrate 1 and the second substrate 2 in the display area AA. The liquid crystal layer comprises a plurality of liquid crystal molecules, which are usually rod-shaped, and the liquid crystal molecules can flow like liquid and also have some crystal characteristics. When the liquid crystal molecules are in an electric field, the arrangement direction thereof will change with the electric field. The liquid crystal display panel controls the rotation of the liquid crystal molecules in the liquid crystal layer by applying a driving voltage to a pixel electrode of the array substrate and a common electrode of the color film substrate, so as to refract the light provided by a backlight module to produce a picture. In addition, a thin film transistor array is prepared on the array substrate to drive the rotation of the liquid crystal molecules, and a color filter is arranged on the color film substrate to display a colored picture.

Further, the first substrate 1 comprises a wiring area LA and a border glue 17 in the border area NA, and conductive particles 171 are arranged in the border glue 17. The second substrate 2 comprises a common electrode layer 23, and the common electrode layer 23 is in signal communication with the common electrode wire 1a through the conductive particles 171. As shown in FIG. 3, the border glue 17 at least partially overlaps the wiring area LA, and the common electrode layer 23 is at least partially hollowed out in the border area NA corresponding to the wiring area LA.

The border glue 17 at least partially overlaps the wiring area LA, which can reduce the width of the border area NA and realize the narrow border design. The partially hollowed-out area of the common electrode layer 23 can prevent the conductive particles 171 in the border glue 17 from making the clock signal line 1c in the wiring area LA communicate with the common electrode layer 23 to cause short-circuiting, thus meeting the requirement for electrical performance. Moreover, the wiring area LA only needs one coating process, which can reduce the process difficulty of border glue 17 application.

Alternatively, the border glue 17 comprises an ultraviolet curable resin such as epoxy resin, and a plurality of conductive particles 171 and glass fibers are dispersed in the border glue as conductive materials. The outer diameter of the conductive particles 171 is generally about 5 μm, and the diameter of the glass fibers is generally about 4 μm. The width of the border glue 17 is generally about 0.5 mm, for example.

According to the display panel provided by the embodiment of the present application, by allowing the border glue 17 of the border area NA of the first substrate 1 to at least partially overlap the wiring area LA, the width of the border area NA can be reduced, and the narrow border design can be realized; moreover, the common electrode layer 23 of the second substrate 2 is at least partially hollowed out in the border area NA corresponding to the clock signal line 1c, which can prevent short-circuiting between the clock signal line 1c in the wiring area LA and the common electrode layer 23 through the conductive particles 171, thus reducing the process difficulty of border glue 17 application, shortening the time of border glue 17 application, improving the production capacity and reducing the manufacturing cost.

The specific structure of the display panel provided by the first embodiment of the present application will be described in further detail with reference to the attached drawings.

Figure 4:
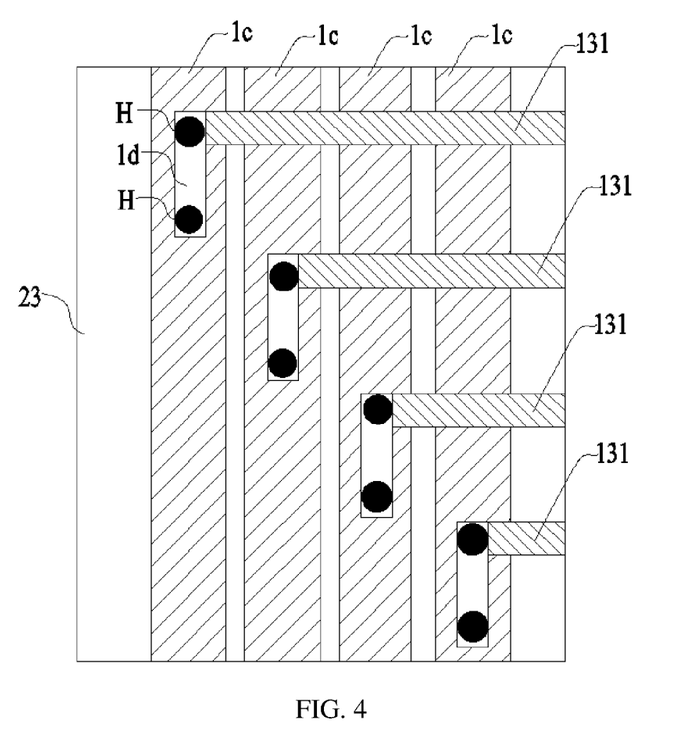
FIG. 4 shows a top view of a wiring area and a corresponding second substrate in FIG. 3.
Figure 5:
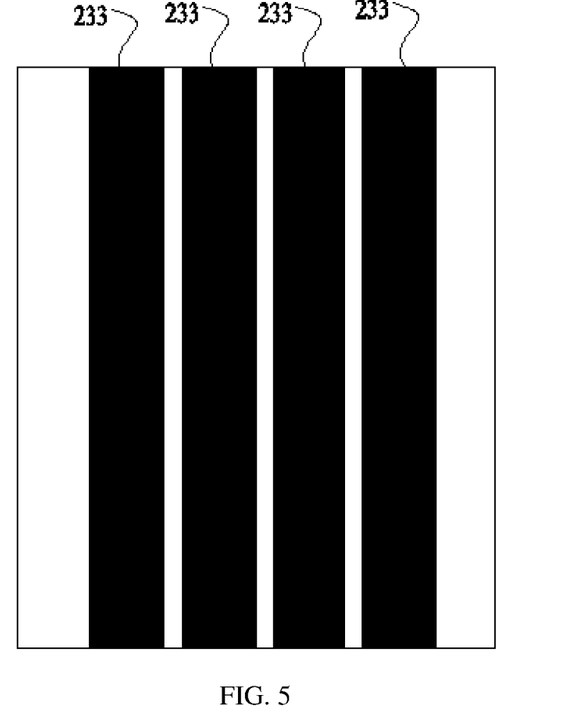
FIG. 5 shows a structural diagram of the second substrate in FIG. 4.

FIG. 4 shows a top view of a wiring area and a corresponding second substrate in FIG. 3; and FIG. 5 shows a structural diagram of the second substrate in FIG. 4.

In some embodiments, the clock signal line 1c is electrically connected to the gate driving circuit 1b through adapter holes H.

As shown in FIGS. 4 and 5, for the first substrate 1 adopting a gate driving circuit 1b architecture (Gate on Array, GOA for short), the number of clock signal lines 1c used in the gate driving circuit 1b is large, so more space is needed. The common clock signal line (CK) 1c is designed with 4 CK, 8 CK, 10 CK, 12 CK and 16 CK, etc. The clock signal line 1c needs to be provided with an adapter hole H to transmit the signals of the clock signal line 1c to the GOA circuit. If these adapter holes H make contact with the conductive particles 171 in the border glue 17 and activate the common electrode layer 23, short-circuiting between different signals may be caused, so that the GOA circuit cannot work normally.

Therefore, in this embodiment, the common electrode layer 23 is at least partially hollowed out in the border area NA corresponding to the clock signal line 1c. In this way, while the border glue 17 at one side of the first substrate 1 overlaps the clock signal line 1c to realize the narrow border design, the conductive particles 171 in the border glue 17 are in contact with the hollowed-out area of the common electrode layer 23 at one side of the second substrate 2, and the common electrode layer 23 will not be activated, thus solving the problem that the GOA circuit cannot work normally.

Further, the clock signal line 1c is provided with a plurality of adapter holes H distributed at intervals; for two adjacent adapter holes H, one adapter hole H is electrically connected with the clock signal line 1c and the other adapter hole H is electrically connected with the gate driving circuit 1b; and a conductive electrode 1d is connected between two adjacent adapter holes H.

As shown in FIG. 4, the clock signal line 1c extends from an upper end to a lower end of the first substrate 1, and the clock signal line 1c and the gate driving circuit 1b are located in different metal layers. In order to realize the electrical connection between the clock signal line 1c and the gate driving circuit 1b, a plurality of adapter holes H are formed in the clock signal line 1c, and a conductive electrode 1d is connected between two adjacent adapter holes H, wherein one end of the conductive electrode 1d is electrically connected with the clock signal line 1c through the adapter hole H, and the other end of the conductive electrode 1d is electrically connected with the gate driving circuit 1b through the adapter hole H, so as to realize signal transmission between different metal layers.

Further, as shown in FIG. 5, the common electrode layer 23 comprises a hollowed-out part 233 in the border area NA, as shown by the black shaded part in the figure, and an orthogonal projection of the hollowed-out part 233 on the first substrate 1 covers the clock signal line 1c. Because the conductive electrode 1d is connected between two adapter holes H, the conductive electrode 1d is in contact with one end of the conductive particles 171, and the other end of the conductive particles 171 is in contact with the hollowed-out part 233 of the common electrode layer 23, the common electrode layer 23 cannot be activated, so that short-circuiting between different signals is avoided, and the problem that the GOA circuit cannot work normally is solved.

Further, the first substrate 1 comprises a first substrate base 10, and a first metal layer 11, an insulating layer 12, a second metal layer 13, a passivation layer 14, a planarization layer 15 and a conductive layer 16 which are sequentially formed on the first substrate base 10, wherein the clock signal line 1c and the common electrode wire 1a are located on the first metal layer 11, the gate driving circuit 1b is located on the second metal layer 13, the conductive electrode 1d is located on the conductive layer 16, one of the adapter holes H passes through the planarization layer 15, the passivation layer 14 and the insulating layer 12, and the other adapter hole H passes through the planarization layer 15 and the passivation layer 14.

In the display area AA, the first substrate 1 comprises the first metal layer 11, the insulating layer 12, a semiconductor layer, the second metal layer 13, the passivation layer 14, the planarization layer 15 and the conductive layer 16 which are sequentially formed on the first substrate base 10. The first metal layer 11 is formed with a scanning line, a gate of a thin film transistor and the common electrode wire 1a, and the second metal layer 13 is formed with a data line, and a source and drain of the thin film transistor. The planarization layer 15 is located above the first metal layer 11, the insulating layer 12, the second metal layer 13 and the passivation layer 14, and can make the whole plane in a flat state and facilitate the preparation of the conductive layer 16. In the display area AA, the conductive layer 16 comprises pixel electrodes distributed into an array, any one of the source and the drain is electrically connected with the data line, and the other one of the source and the drain is electrically connected with the pixel electrodes. In the wiring area LA of the border area NA, the conductive layer 16 comprises the conductive electrode 1d for conducting signals of different metal layers.

Alternatively, the conductive layer 16 may be made from indium tin oxide (ITO). In one example, the clock signal line 1c is located on the first metal layer 11, the GOA circuit 1b is located on the second metal layer 13, and the clock signal line 1c communicates with the GOA circuit 1b through the adapter hole H. At the adapter hole H, the insulating layer 12, the passivation layer 14 and the planarization layer 15 above the first metal layer 11 are cut open by dry etching, and the passivation layer 14 and the planarization layer 15 above the second metal layer 13 are cut open by dry etching. The conductive electrodes 1d connect metal wires of different metal layers.

It can be understood that in other examples, the clock signal line 1c can also be located on the second metal layer 13, the GOA circuit 1b is located on the first metal layer 11, and the clock signal line 1c communicates with the GOA circuit 1b through the adapter hole H. No more details will be given.

Further, the adapter hole H and the gate driving circuit 1b are electrically connected through a metal wire 131 located on the second metal layer 13. In this way, the signal of the clock signal line 1c can be transmitted to the display area AA through the metal wire 131.

In some embodiments, the second substrate 2 comprises a second substrate base 20, and a color filter layer (not shown in the figure), a shading layer 22 and a common electrode layer 23 which are sequentially formed on the second substrate base 20. The color filter layer comprises a plurality of color filter units located in the display area AA, the shading layer 22 comprises a plurality of shading parts, and the shading parts are arranged between adjacent color filter units and also arranged corresponding to the border area NA.

The shading layer 22 can be a black matrix (BM), which has a good shading effect. In the display area AA, the shading parts arranged between adjacent color filter units of the second substrate 2 can prevent light emitted by subpixels of different colors from mixing, so as to improve the display effect. In the border area NA, the shading part can prevent light leakage in the wiring area LA, thus further improving the display effect.

Further, one side of the first substrate 1 also comprises a first alignment film (not shown in the figure), which is located on a side, away from the first substrate base 10, of the conductive layer 16. One side of the second substrate 2 further comprises a second alignment film (not shown in the figure), which is located on a side, away from the second substrate base 20, of the common electrode layer 23. One end of the conductive particles 171 is connected to the common electrode wire 1a through the first alignment film, and the other end is electrically connected to the common electrode layer 23 through the second alignment film.

In the box-forming process of the liquid crystal display panel, the first alignment film and the second alignment film are usually made on opposite surfaces of the first substrate 1 and the second substrate 2 respectively, and the first alignment film and the second alignment film are used for restricting the orientation of liquid crystal molecules in the liquid crystal layer. Then, the border glue 17 for sealing is applied to the wiring area LA of the first substrate 1 and liquid crystal is instilled, and then the first substrate 1 and the second substrate 2 are bonded in a vacuum state. Finally, the border glue 17 is cured by ultraviolet irradiation, so as to complete the packaging of the first substrate 1 and the second substrate 2.

The first alignment film and the second alignment film have fluidity, and the viscosity is reduced by adding solvents to resin materials such as polyimide. Taking the manufacturing process of the first alignment film as an example, there are two main ways to make the first alignment film, one is to transfer the first alignment film by using a printing plate, and the other is to make the first alignment film by inkjet printing. Taking the inkjet printing method as an example, firstly, the pattern of the first alignment film is input into a computer, then a first alignment film solution is sprayed on the first substrate 1 through a nozzle, and the first alignment film is formed after curing.

Second Embodiment

Figure 6:
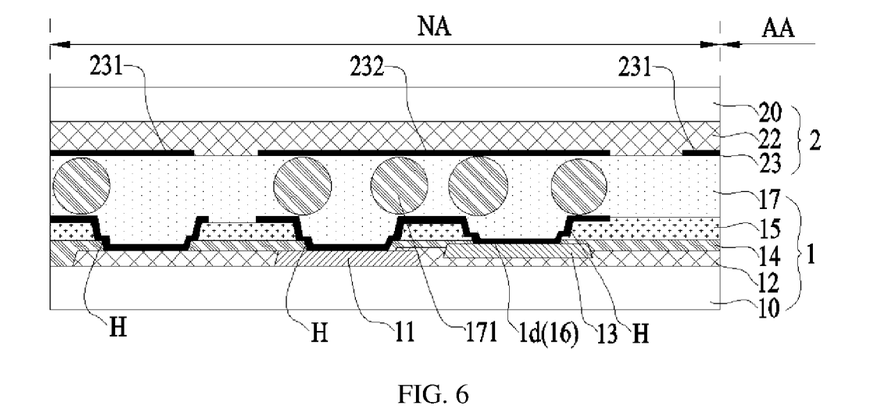
FIG. 6 shows a structural diagram of a display panel provided by a second embodiment of the present application.
Figure 7:
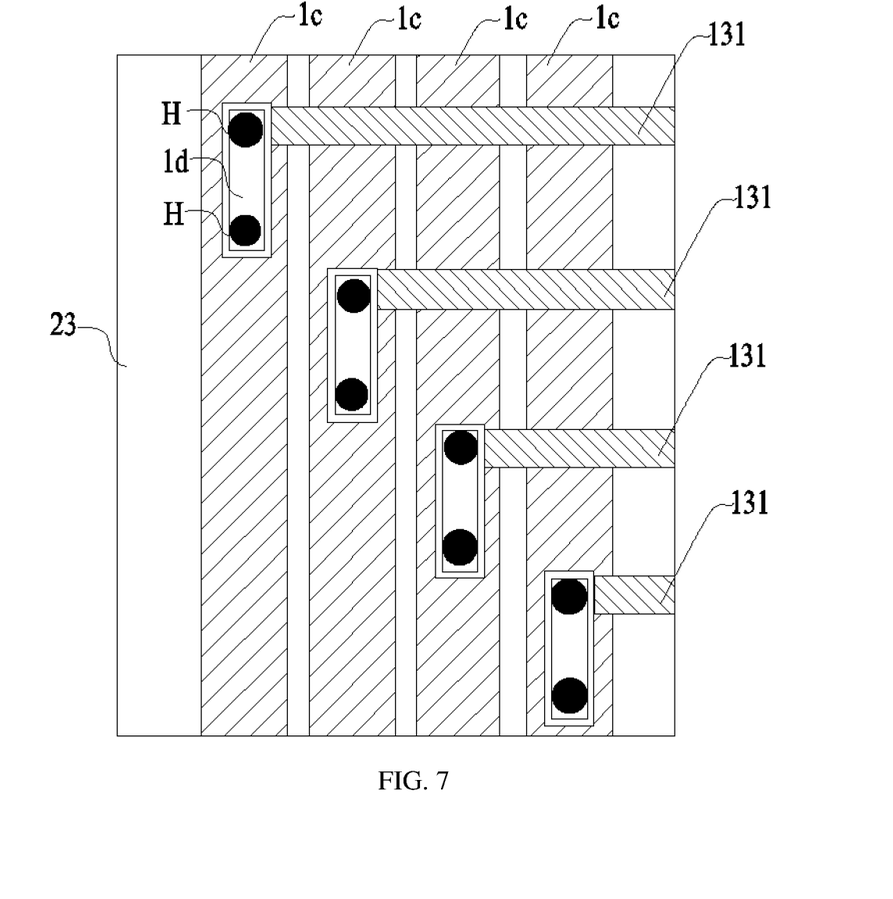
FIG. 7 shows a top view of a wiring area and a corresponding second substrate in FIG. 6.

FIG. 6 shows a structural diagram of a display panel provided by a second embodiment of the present application; FIG. 7 shows a top view of a wiring area and a corresponding second substrate in FIG. 6; and FIG. 8 shows a structural diagram of the second substrate in FIG. 7.

Figure 8:
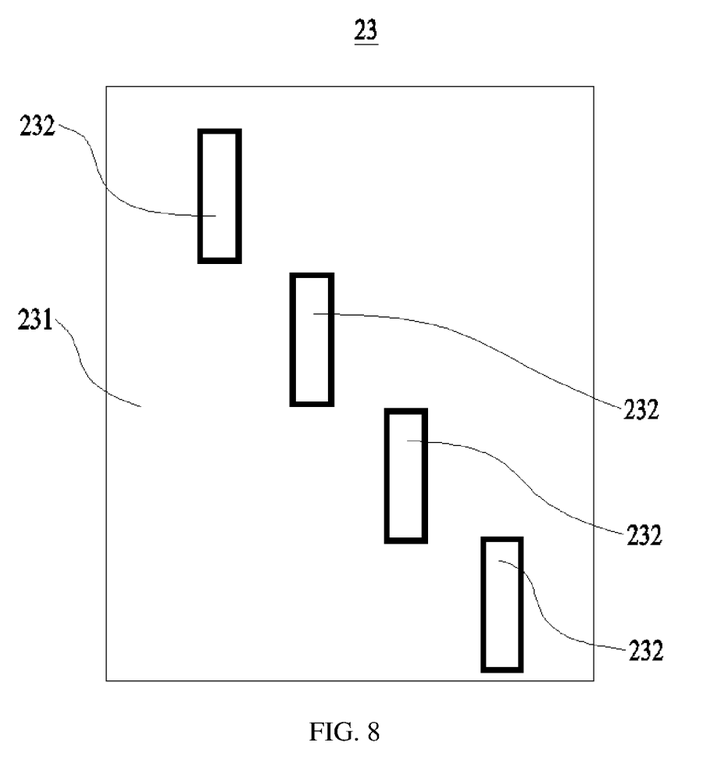
FIG. 8 shows a structural diagram of the second substrate in FIG. 7.

As shown in FIGS. 6 to 8, the display panel provided by the second embodiment of the present application is similar in structure to the display panel provided by the first embodiment, except that the structure of a common electrode layer 23 of the second substrate 2 is different.

Specifically, the common electrode layer 23 comprises a first common electrode part 231 and a second common electrode part 232 in a border area NA. An orthogonal projection of the first common electrode part 231 on the first substrate 1 covers a conductive electrode 1d and an adapter hole H, the second common electrode part 232 is arranged around the first common electrode part 231, and an area between the second common electrode part 232 and the first common electrode part 231 is hollowed out.

As shown in FIG. 8, the area between the second common electrode part 232 and the first common electrode part 231 is hollowed out, as shown by the black shaded part in the figure. Because the orthogonal projection of the first common electrode part 231 on the first substrate 1 covers the conductive electrode 1d and the adapter hole H, an island shape is formed, and because the area between the second common electrode part 232 and the first common electrode part 231 is hollowed out, insulation is realized between the two. The second common electrode part 232 serves as a common electrode of the second substrate 2, and is used for receiving an input voltage signal of the second substrate 2. When one end of conductive particles in a border glue 17 is in contact with the conductive electrode 1d of a clock signal line 1c for transferring signals, and the other end is in contact with the first common electrode part 231, because the second common electrode part 232 and the first common electrode part 231 are insulated from each other, the signal of the clock signal line 1c will not be transmitted to the common electrode layer 23 to cause short-circuiting, thus avoiding the problem that the GOA circuit cannot work normally.

Further, an embodiment of the present application provides a display device, which comprises any display panel described above and a backlight module, wherein the backlight module is arranged at a backlight side of the display panel and used for providing a light source for the display panel. As the liquid crystal display panel is a non-emissive light receiving element, the light source needs to be provided through the backlight module arranged at the backlight side of the liquid crystal display panel.

The display device provided by the embodiment of the present application comprises a display panel and a backlight module, wherein the display panel is provided with a display area AA and a border area NA located at the periphery of the display area AA; the display panel comprises a first substrate 1 and a second substrate 2 which are oppositely arranged; the first substrate 1 comprises a wiring area LA and a border glue 17 in the border area NA, and conductive particles 171 are arranged in the border glue 17. The second substrate 2 comprises a common electrode layer 23, and the common electrode layer 23 is in signal communication with the common electrode wire 1a through the conductive particles 171. The border glue 17 at least partially overlaps the wiring area LA, and the common electrode layer 23 is at least partially hollowed out in the border area NA corresponding to the wiring area LA. In this way, by allowing the border glue 17 of the border area NA of the first substrate 1 to at least partially overlap the wiring area LA, the width of the border area NA can be reduced, and the narrow border design can be realized; moreover, the common electrode layer 23 of the second substrate 2 is at least partially hollowed out in the border area NA corresponding to the wiring area LA, which can prevent short-circuiting between the signal line in the wiring area LA and the common electrode layer 23 through the conductive particles 171, thus reducing the process difficulty of border glue 17 application, shortening the time of border glue 17 application, improving the production capacity and reducing the manufacturing cost.

It can be understood that the technical solution of the first substrate 1 provided by the embodiments of this application can be widely used in various liquid crystal display panels, such as Twisted Nematic (TN) display panel, in-plane switching (IPS) display panel, vertical alignment (VA) display panel and multi-domain vertical alignment (MVA) display panel.

In addition, it should be noted that as an array substrate, the first substrate 1 provided in the embodiments of the present application can also have the functions of a color filter layer (Color Filter on Array, COA for short), the corresponding second substrate 2 can be called an opposite substrate, and other functions are similar and will not be repeated here.

It should be easily understood that "on" or "above" in the present application should be interpreted in the broadest way, so that "on" not only means "directly on something", but also includes the meaning of "on something" with intermediate features or layers in between, and "above" not only means "above something", but also includes the meaning of "above something" without intermediate features or layers in between (that is, directly on something).

As used herein, the term "substrate base" refers to a material on which a subsequent material layer is added. The substrate base itself can be patterned. The material added on top of the substrate can be patterned or can remain unpatterned. In addition, the substrate base can include a wide range of materials, such as silicon, germanium, gallium arsenide, indium phosphide, etc. Alternatively, the base substrate base may be made of a non-conductive material (e.g., glass, plastic or sapphire wafer, etc.).

As used herein, the term "layer" may refer to a material portion of a region having a certain thickness. A layer may extend over an entire underlying structure or overlying structure, or may have a smaller range than that of the underlying structure or overlying structure. Further, a layer can be a region of a homogeneous or heterogeneous continuous structure, and its thickness is less than that of the continuous structure. For example, a layer may be located between the top and bottom surfaces of the continuous structure or between any pair of transverse planes at the top and bottom surfaces. A layer may extend laterally, vertically and/or along a tapered surface. The substrate base may be a layer, may comprise one or more layers therein, and/or may have one or more layers located on, above and/or below it. A layer may comprise multiple layers. For example, an interconnect layer may comprise one or more conductor and contact layers (in which contacts, interconnects and/or via holes are formed) and one or more dielectric layers.

Finally, it should be noted that the above embodiments are only used to illustrate the technical solutions of the present application, but not to limit it. Although the present application has been described in detail with reference to the foregoing embodiments, those of ordinary skill in the art should understand that the technical solutions described in the foregoing embodiments can still be modified, or some or all of the technical features can be equivalently replaced, and these modifications or substitutions do not make the essence of the corresponding technical solutions deviate from the scope of the technical solutions of each embodiment of the present application.

What is claimed is:

1. A display panel having a display area and a border area located at the periphery of the display area, wherein the display panel comprises a first substrate and a second substrate which are oppositely arranged, the first substrate comprises a wiring area and a border glue in the border area, the wiring area comprises a common electrode wire, a gate driving circuit and a clock signal line which are sequentially arranged in a direction away from the display area, conductive particles are arranged in the border glue, the second substrate comprises a common electrode layer, and the common electrode layer is in signal communication with the common electrode wire through the conductive particles; wherein
   the border glue at least partially overlaps the wiring area, and the common electrode layer is at least partially hollowed out in the border area corresponding to the clock signal line, so that the common electrode layer is insulated from the clock signal line;
   the clock signal line is electrically connected with the gate driving circuit through an adapter hole;
   the clock signal line is provided with a plurality of adapter holes distributed at intervals, and for two adjacent adapter holes, one adapter hole is electrically connected with the clock signal line, and the other adapter hole is electrically connected with the gate driving circuit; and a conductive electrode is connected between the two adjacent adapter holes; and
   the common electrode layer comprises a first common electrode part and a second common electrode part in the border area, an orthogonal projection of the first common electrode part on the first substrate covers the conductive electrode and the adapter hole, the second common electrode part is arranged around the first common electrode part, and an area between the second common electrode part and the first common electrode part is hollowed out.

2. The display panel according to claim 1, wherein the common electrode layer comprises a hollowed-out part in the border area, and an orthogonal projection of the hollowed-out part on the first substrate covers the clock signal line.

3. The display panel according to claim 2, wherein the first substrate comprises a first substrate base, and a first metal layer, an insulating layer, a second metal layer, a passivation layer, a planarization layer and a conductive layer which are sequentially formed on the first substrate base, the clock signal line and the common electrode wire are located on the first metal layer, the gate driving circuit is located on the second metal layer, the conductive electrode is located on the conductive layer, one of the adapter holes passes through the planarization layer, the passivation layer and the insulating layer, and the other adapter hole passes through the planarization layer and the passivation layer.

4. The display panel according to claim 1, wherein the first substrate comprises a first substrate base, and a first metal layer, an insulating layer, a second metal layer, a passivation layer, a planarization layer and a conductive layer which are sequentially formed on the first substrate base, the clock signal line and the common electrode wire are located on the first metal layer, the gate driving circuit is located on the second metal layer, the conductive electrode is located on the conductive layer, one of the adapter holes passes through the planarization layer, the passivation layer and the insulating layer, and the other adapter hole passes through the planarization layer and the passivation layer.

5. The display panel according to claim 3, wherein the adapter hole and the gate driving circuit are electrically connected through a metal wire located on the second metal layer.

6. The display panel according to claim 4, wherein the adapter hole and the gate driving circuit are electrically connected through a metal wire located on the second metal layer.

7. The display panel according to claim 2, wherein the first substrate comprises a first substrate base, and a first metal layer, an insulating layer, a second metal layer, a passivation layer, a planarization layer and a conductive layer which are sequentially formed on the first substrate base, the clock signal line is located on the second metal layer, the gate driving circuit is located on the first metal layer, the conductive electrode is located on the conductive layer, one of the adapter holes passes through the planarization layer, the passivation layer and the insulating layer, and the other transfer hole passes through the planarization layer and the passivation layer.

8. The display panel according to claim 1, wherein the first substrate comprises a first substrate base, and a first metal layer, an insulating layer, a second metal layer, a passivation layer, a planarization layer and a conductive layer which are sequentially formed on the first substrate base, the clock signal line is located on the second metal layer, the gate driving circuit is located on the first metal layer, the conductive electrode is located on the conductive layer, one of the adapter holes passes through the planarization layer, the passivation layer and the insulating layer, and the other transfer hole passes through the planarization layer and the passivation layer.

9. The display panel according to claim 7, wherein the adapter hole and the gate driving circuit are electrically connected through a metal wire located on the first metal layer.

10. The display panel according to claim 8, wherein the adapter hole and the gate driving circuit are electrically connected through a metal wire located on the first metal layer.

11. The display panel according to claim 1, wherein the second substrate comprises a second substrate base, and a color filter layer, a shading layer and the common electrode layer which are sequentially formed on the second substrate base, the color filter layer comprises a plurality of color filter units located in the display area, the shading layer comprises a plurality of shading parts, and the shading parts are arranged between adjacent color filter units and also arranged corresponding to the border area.

12. The display panel according to claim 3, wherein one side of the first substrate further comprises a first alignment film, and the first alignment film is located on a side, away from the first substrate base, of the conductive layer;
  one side of the second substrate further comprises a second alignment film, and the second alignment film is located on a side, away from the second substrate base, of the common electrode layer; and
  one end of the conductive particles is connected with the common electrode through the first alignment film, and the other end is electrically connected with the common electrode layer through the second alignment film.

13. The display panel according to claim 4, wherein one side of the first substrate further comprises a first alignment film, and the first alignment film is located on a side, away from the first substrate base, of the conductive layer;
  one side of the second substrate further comprises a second alignment film, and the second alignment film is located on a side, away from the second substrate base, of the common electrode layer; and
  one end of the conductive particles is connected with the common electrode through the first alignment film, and the other end is electrically connected with the common electrode layer through the second alignment film.

14. The display panel according to claim 11, wherein the first substrate is an array substrate, the second substrate is a color film substrate, and a liquid crystal layer is further arranged between the first substrate and the second substrate in the display area.

15. The display panel according to claim 1, wherein the first substrate further comprises a color filter layer, and the color filter layer comprises a plurality of color filter units located in the display area; and the second substrate comprises a second substrate base, and a shading layer and the common electrode layer which are sequentially formed on the second substrate base, and a liquid crystal layer is further arranged between the first substrate and the second substrate in the display area.

16. The display panel according to claim 1, wherein the border glue comprises an ultraviolet curable resin, and the conductive particles and glass fibers dispersed in the ultraviolet curable resin.

17. A display device, comprising:
  the display panel according to claim 1; and
  a backlight module arranged at a backlight side of the display panel and used for providing a light source for the display panel.

* * * * *